United States Patent [19]
Haenel et al.

[11] Patent Number: 5,849,195
[45] Date of Patent: Dec. 15, 1998

[54] COMPOSITE MEMBRANE, PROCESS OF MANUFACTURING IT AND PROCESS OF USING IT

[75] Inventors: Peter Haenel, Nidderau; Erika Schwerdtner, Eschborn; Harald Helmrich, Frankfurt am Main, all of Germany

[73] Assignee: Metallgesellschaft Aktiengesell-Schaft, Frankfurt am Main, Germany

[21] Appl. No.: 409,253

[22] Filed: Mar. 23, 1995

[30] Foreign Application Priority Data

Mar. 23, 1994 [DE] Germany .......................... 44 09 906.1

[51] Int. Cl.$^6$ .......................... B01D 61/00; B01D 61/36; B01D 69/12; B01D 71/30
[52] U.S. Cl. .................. 210/651; 210/490; 210/500.42; 210/640; 264/45.1
[58] Field of Search .................................... 210/640, 651, 210/652, 654, 500.42, 490, 491, 499; 96/12; 264/45.1; 428/304.4, 311.1, 311.5, 315.5, 315.9, 316.6

[56] References Cited

U.S. PATENT DOCUMENTS

| | | | |
|---|---|---|---|
| 3,615,024 | 10/1971 | Michaels | 210/500.42 |
| 3,950,247 | 4/1976 | Chiang et al. | 210/640 X |
| 3,966,834 | 6/1976 | Perry et al. | 210/651 |
| 4,100,238 | 7/1978 | Shinomura | 264/49 |
| 4,377,481 | 3/1983 | Jakabhazy | 210/500.42 |
| 4,797,187 | 1/1989 | Davis et al. | 96/12 |
| 4,952,318 | 8/1990 | Pasternak et al. | 210/640 X |
| 5,164,088 | 11/1992 | Hanel et al. | 210/500.39 |
| 5,183,571 | 2/1993 | Hanel et al. | 210/619 |

FOREIGN PATENT DOCUMENTS 0564045  10/1993  European Pat. Off. .

*Primary Examiner*—Joseph W. Drodge
*Attorney, Agent, or Firm*—Fulbright & Jaworski

[57] ABSTRACT

Disclosed is a composite membrane for removing water from dilute organic or inorganic acids by pervaporation or vapor permeation. The composite membrane in accordance with the invention is of a porous carrier layer, a porous backing layer, and a non-porous separating layer, which consists of a PVC-PCac copolymer having a PVac content of 10 to 25% by weight of the copolymer.

12 Claims, No Drawings

COMPOSITE MEMBRANE, PROCESS OF MANUFACTURING IT AND PROCESS OF USING IT

BACKGROUND OF THE INVENTION

The present invention is in a composite membrane consisting of a porous carrier layer, a porous backing layer, and a non-porous separating layer and a process for manufacturing the composite membrane.

EP-A-O 564 045 discloses a composite membrane in which the separating layer comprises a dense defect free layer of polyvinyl chloride (PVC). Such a membrane can be used to remove water from dilute organic acids in a pervaporation process. From that document it is known to make the separating layer from polyvinyl chloride blends having small contents of polyvinyl acetate (PVac), polyvinyl alcohol (PVal), and other polymers. Separating layers made of a pure PVC polymer are preferred and a pure PVC polymer is used in the separating layer in all examples described in the document. The selectivities and permeate flow rates which were achieved were satisfactory in part although the selectivity was rather low at high permeate flow rates.

It is an object of the present invention to provide a composite membrane which is superior to the known membranes in its separating properties, field of application and mechanical stability.

Another object of the invention is to provide a process of manufacturing such a composite membrane.

THE INVENTION

In accordance with the invention the above stated objects are accomplished in that a composite membrane is formed of a porous carrier layer, a porous backing layer, and a non-porous separating layer. The carrier layer is a nonwoven or woven fabric made of polyester, polyphenylene sulfide, polypropylene, polyvinlidene fluoride, polyamide or glass fibers. The backing layer which has a lower porosity than the carrier layer, consists of polysulfone, polyimide, polyvinyl alcohol, polyurethane, polyvinylidene fluoride, polyether sulfone, polyacrylonitrile, polyether ketone, polyether ether ketone, polyether imide or their copolymers. The non-porous separating layer is substantially of a polyvinyl chloride-polyvinyl acetate copolymer, in which the polyvinyl acetate amounts to 10 to 25% by weight of the copolymer.

The composite membranes of the invention give improved separation results under pervaporation or vapor permeation conditions. Additionally, the composite membranes of the invention are useful not only to remove water from organic acids, such as formic acid, acetic acid, and oxalic acid, but surprisingly are useful to remove water from inorganic acids, such as, for example, HCl, $H_2SO_4$, $H_3PO_4$, $HNO_3$.

In a preferred embodiment, the separating layer is made of a PVC-PVac copolymer which contains about 1% by weight of one or more dicarboxylic acids.

In another preferred embodiment, the separating layer has a thickness of 3 to 15 micrometers.

In another preferred embodiment, the backing layer consists of polyacrylonitrile (PAN).

Typical thickness ranges for the carrier layer and the backing layer are 30 to 200 $\mu$m and 20 to 100 $\mu$m, respectively.

The invention also, in another aspect, includes a process for the manufacture of the membrane. In the manufacture of the membrane:

a porous backing layer is deposited on a carrier layer made of a nonwoven or woven fabric and is dried;

a solution of 5 to 40% by weight of a PVC-PVac copolymer in a solvent or solvent mixture which is inert for the carrier material consisting of the carrier layer and backing layer is deposited on the backing layer of the carrier material; and the solvent mixture is evaporated and the composite carrier layer, backing layer, and deposited separating layer are subsequently after-baked at a temperature of from 80° to 160° C. for 1 to 60 minutes to form a composite membrane of the invention.

The composite membrane of the invention may be used as a pervaporation or vapor permeation membrane to separate water from dilute organic or inorganic acids.

Water is desirably removed from dilute organic or inorganic acids by means of the composite membrane in accordance with the invention in a pervaporation or vapor permeation process, in which water is removed from the dilute acid having a water content of 1 to 90% by weight at a feed temperature of 50° to 95° C. and a feed pressure of 1 to 5 bars whereas the pressure on the permeate side is 0.5 to 50 mbars.

The following examples will provide additional detail with regard to the invention.

EXAMPLE 1

A solution of 30% wt.-% of a PVC-PVac copolymer (Vinol® H15/45M available from Wacker) in acetone was applied by means of a laboratory coater (LTSV available from Mathis) to a carrier material consisting of a porous backing layer of polyacrylonitrile on a woven fabric (CMF-DY-O4O available from CM-Celfa). Care must be taken that the carrier material is perfectly dry before it is coated. After the solvent had evaporated, a separating layer having a thickness of about 7 micrometers remained on the carrier material. The composite membrane was then after-baked at 140° C. for about 10 minutes.

EXAMPLE 2

A wet film as described in Example 1 was deposited in a thickness of 10 micrometers on a carrier material as described in Example 1. The carrier material was perfectly dry before it was coated. After the acetone had been evaporated at 100° C. for 10 minutes, a separating layer in a thickness of 3 micrometers had formed.

EXAMPLE 3

The manufacture of a composite membrane as described in Example 2 was repeated. After the acetone had been evaporated at 150° for 10 minutes, a separating layer in a thickness of 3 micrometers had formed.

EXAMPLE 4

A composite membrane manufactured as described in Example 1 was used for a progressive removal of water from 80% by weight acetic acid in a pervaporation process. When the acetic acid was fed at a temperature of 80° C. and a pressure of 3 bars and the pressure on the permeate side was 5 mbars, the permeate was initially found to contain acetic acid in a concentration of 0.4% by weight at a permeate flow rate of 0.28 kg/m²-h. Toward the end of the progressive removal of water, an acetic acid of 98% by weight was fed and the content of acetic acid in the permeate rose to 13.97 wt.-% whereas the permeate flow rate decreased to 0.15 kg/m²-h.

The results produced with the membranes in accordance with the invention and the known results produced in the prior art (A, B, i.e., EP 0 564 045 on page 2 as i and j) under normalized conditions have been compiled in the following Table. The Table also contains the data obtained when the membrane manufactured as described in Example 1 was used to remove water from inorganic acids. The separation factor is defined as $$\alpha = \frac{X_A \times Y_B}{X_B \times Y_A}$$

wherein $X_A$, $X_B$ are the concentrations of the components A and B in the mixed feedstock and $Y_A$, $Y_B$ are the concentrations of the components A and B in the vapor which permeates through the membrane. The comparison reveals the superior separation properties of the membranes in accordance with the invention.

TABLE

| No. | Film thickness μm | temperature °C. | Drying Drying time min | Measuring temperature °C. | Permeate pressure moars | Separation factor α | Specific permeate flow rate per μm of layer kg/m²/h |
|---|---|---|---|---|---|---|---|
| | Acetic acid/water about 80/20% by weight | | | | | | |
| 1 | 7 | 140 | 10 | 80, 9 | 5 | 1079 | 1, 96 |
| 2 | 3 | 100 | 10 | 79, 6 | 5 | 159 | 0, 96 |
| 3 | 3 | 150 | 10 | 79, 8 | 5 | 44050 | 1, 11 |
| A | 9 | 20 | | | | 567 | 0, 35 |
| B | 3 | 20 | | | | 231 | 0, 45 |
| | Sulfuric acid/water about 70/30% by weight | | | | | | |
| 1 | 7 | 140 | 10 | 60, 9 | 5 | 4285 | 0, 28 |
| | Phosphoric acid/water about 70/30% by weight | | | | | | |
| 1 | 7 | 140 | 10 | 63, 0 | 15 | 4148 | 1, 82 |

It will be understood that the specification and examples are illustrative but not limitative of the present invention and that other embodiments within the spirit and scope of the invention will suggest themselves to those skilled in the art.

What is claimed is:

1. A composite membrane comprising:
   a porous carrier layer of a nonwoven or woven fabric;
   a porous backing layer consisting essentially of at least one material selected from the group consisting of polysulfone, polyimide, polyvinyl alcohol, polyurethane, polyvinylidene fluoride, polyether sulfone, polyacrylonitrile, polyether ketone, polyether ether ketone, polyether imide and their copolymers; and
   a non-porous separating layer, consisting essentially of a polyvinyl chloride-polyvinyl acetate copolymer in which the polyvinyl acetate amounts to 10 to 25% by weight of the copolymer, the membrane being formed by a process comprising the step of subjecting the carrier layer together with the separating layer to a temperature of 80° to 160° C. for 1 to 60 minutes.

2. The composite membrane of claim 1 wherein the fabric of the carrier layer is of at least one material selected from the group consisting of polyester, polyphenylene sulfide, polypropylene, polyvinylidene fluoride, polyamide and glass fibers.

3. The composite membrane of claim 1, wherein the PVC-PVac copolymer contains about 1 wt.-% of one or more dicarboxylic acids.

4. The composite membrane of claim 1, wherein the separating layer has a thickness of 3 to 15 micrometers.

5. The composite membrane of claim 1, wherein the backing layer is polyacrylonitrile.

6. A process for manufacturing the composite membrane of claim 1, comprising:
   a) depositing a porous backing layer of at least one material selected from the group consisting of polysulfone, polyimide, polyvinyl alcohol, polyurethane, polyvinylidene fluoride, polyether sulfone, polyacrylonitrile, polyether ketone, polyether ether ketone, polyether imide and their copolymers on a carrier layer made of nonwoven or woven fabric;
   b) drying the deposited backing layer on said carrier layer to form a carrier material;
   c) depositing on said carrier material a solution of 5 to 40% by weight of a polyvinyl chloride-polyvinyl acetate copolymer in an organic solvent or mixture of organic solvents which is inert for the carrier material;
   d) evaporating the solvent or solvent mixture; and
   e) subjecting the carrier material with the deposited copolymer to a temperature of 80° to 160° C. for 1 to 60 minutes to form the composite membrane.

7. The process of claim 6 wherein the solvent or mixture of solvents comprises acetone.

8. The process of claim 7 wherein the acid is acetic acid.

9. A process of removing water from a dilute organic or inorganic acid with the composite membrane of claim 1, comprising contacting the composite membrane with a stream containing 1 to 90 wt.-% water and an organic and/or an inorganic acid at a feed temperature of 50° to 95° C. and a feed pressure of 1 to 5 bars.

10. The process of claim 9 wherein the pressure on the permeate side of the membrane is 0.5 to 50 mbars.

11. The process of claim 9 wherein the water is removed from at least one inorganic acid selected from the group consisting of HCl, $H_2SO_4$, $H_3PO_4$ and $HNO_3$.

12. The process of claim 9 wherein the water is removed from at least one organic acid selected from the group consisting of formic acid, acetic acid and oxalic acid.

\* \* \* \* \*